Jan. 26, 1954

J. G. AGUILAR ET AL 2,667,196

METHOD AND APPARATUS FOR STEMMING AND FOR PITTING CHERRIES AND THE LIKE

Filed Jan. 30, 1950

INVENTOR.
JOHN G. AGUILAR &
BY   WILLIAM A. COX.

Boykin, Mohler & Beckley
ATTORNEYS.

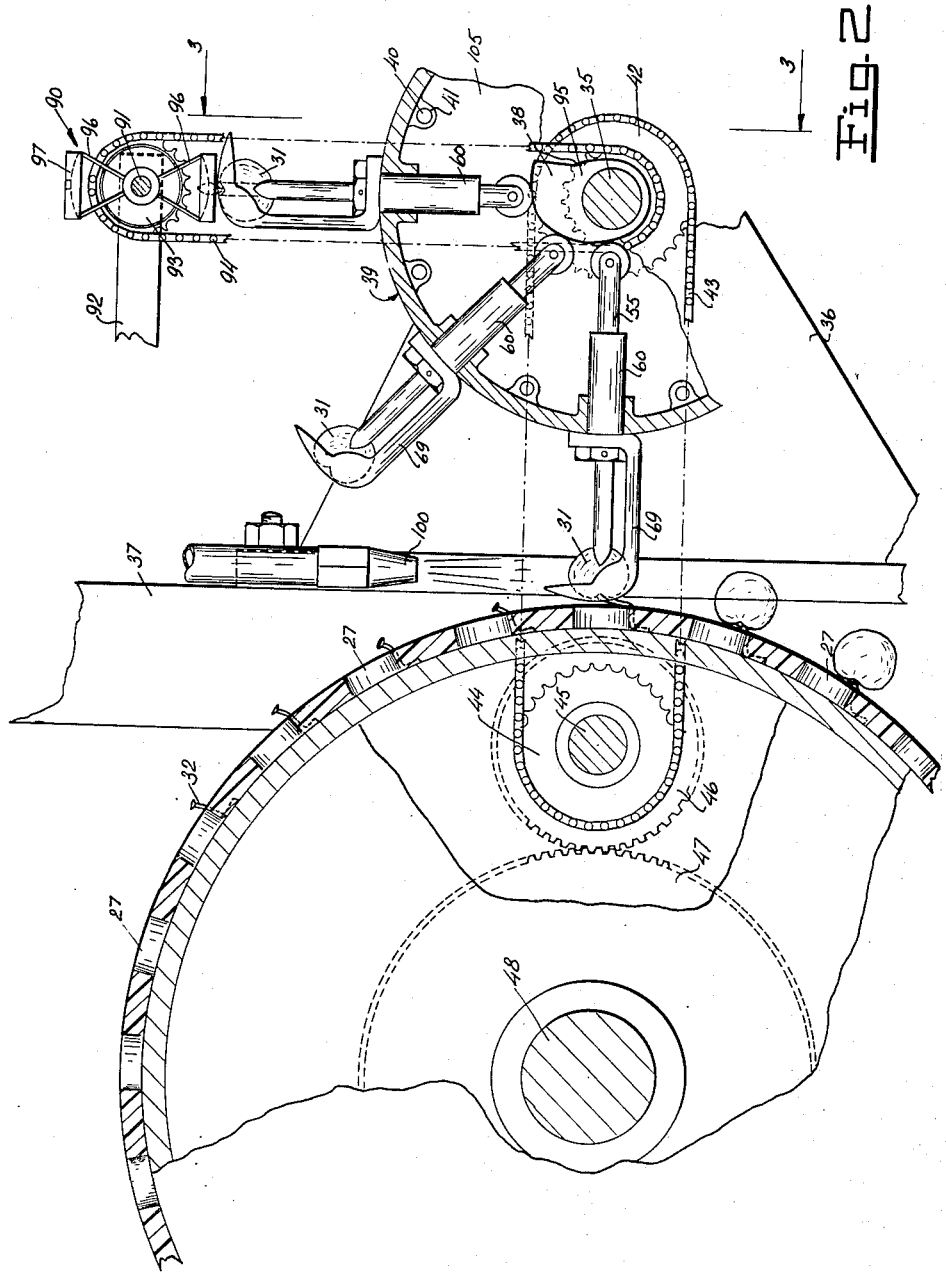

Jan. 26, 1954

J. G. AGUILAR ET AL 2,667,196

METHOD AND APPARATUS FOR STEMMING AND
FOR PITTING CHERRIES AND THE LIKE

Filed Jan. 30, 1950

INVENTOR.
JOHN G. AGUILAR. &
WILLIAM A. COX.
BY

ATTORNEYS.

Patented Jan. 26, 1954

2,667,196

UNITED STATES PATENT OFFICE 2,667,196

METHOD AND APPARATUS FOR STEMMING AND FOR PITTING CHERRIES AND THE LIKE

John G. Aguilar and William A. Cox, San Francisco, Calif.

Application January 30, 1950, Serial No. 141,322

5 Claims. (Cl. 146—17)

This invention relates to an apparatus and method for stemming and for pitting cherries and the like and has for one of its objects the provision of means for orienting cherries and for pitting them along their stem blossom axes after such orientation, and for removing the stems at about the same time the cherries are pitted.

Heretofore, one of the principal difficulties encountered in the pitting of cherries has been that of orienting the cherries so that the pitting rod, or similar device, will operate along the stem-blossom axis of each cherry, pushing the pit out of the cherry on said axis. The finally pitted cherry will resemble a pitted olive, except in that it will have a passageway through it coaxial with said stem-blossom axis.

Inasmuch as cherries are substantially spherical, their stem-blossom axes are not easily aligned with the reciprocable pitter. Many attempts have been made to orient the cherries by utilizing such surface characteristics as the cherries have such as the recessed stem end, and in some instances the suture. However, these attempts have not been successful for the reason that said surface characteristics are not sufficiently uniform nor well defined to give uniform results.

The great majority of cherries that are picked have their stems attached. This is the approved method of picking cherries. The present invention employs this physical characteristic in orienting the cherries for pitting, by pulling each cherry by its stem against a support. In each instance the direction of pull is in the same direction, hence, each cherry will have its stem-blossom axis aligned with said direction of pull and with the taut portion of the stem that is between the cherry and the pulling agency. An elongated pitter is positioned to be coaxial with said axis and to reciprocate longitudinally of the same through the cherry from its blossom end as soon as the cherry is oriented as above described, hence the pit of each cherry will be pushed out of the same along said axis and at substantially the same time the stem will be pulled from the cherry. This makes the stemming and pitting substantially simultaneous. By pushing the pit out of the stem-end of the cherry, the stemming would occur even though no further pull were exerted on the stem, although the positive pulling of the stem is preferable.

One of the objects of the present invention is the above method of stemming and pitting a cherry and another object is the provision of apparatus that is adapted to carry out the steps of said method.

An additional object of the invention is the provision of means for cutting a cherry into several pieces at the same time it is pitted by the method and apparatus above noted, and with said cutting action being in a plane in which the stem-blossom axis of the cherry is disposed.

Other objects and advantages will appear in the description and in the drawings, such as the provision of improved means for holding each cherry during pitting thereof, and after each cherry is oriented so that its pit will be pushed from the cherry along its stem-blossom axis, without mutilating the cherry.

In the description and claims it is to be understood that the stem-blossom axis is intended to refer to the axis of the cherry that extends through its stem and blossom ends and through the stem and blossom ends of the pit. The stem end of the cherry is the end to which the stem is attached, and the opposite side or end of the cherry is its blossom end.

In the drawings,

Fig. 2 is an enlarged fragmentary view, partly in section, showing the means for orienting and pitting the cherries as well as for stemming them and with the clamping arms removed for clarity.

Figure 1:
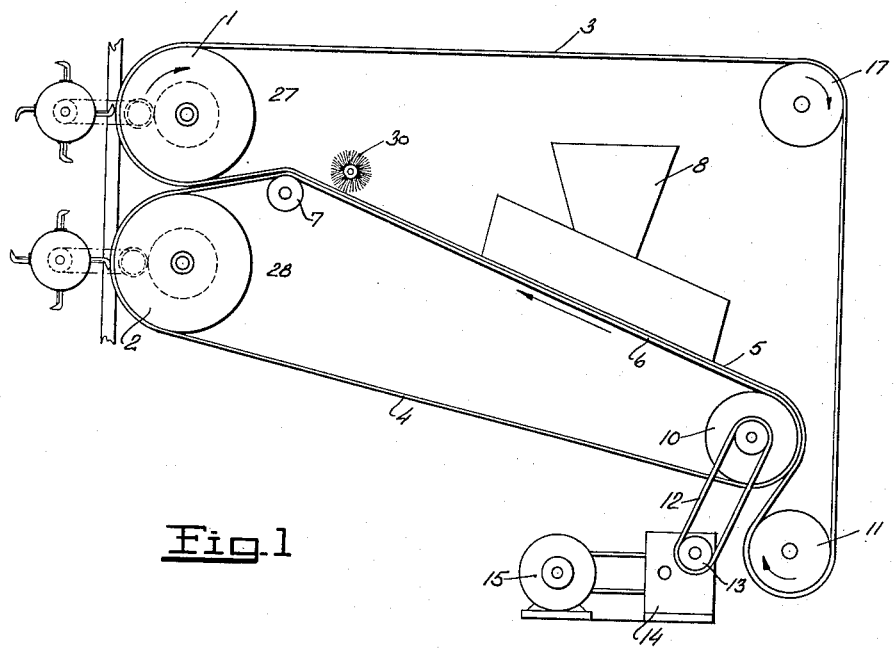
Fig. 1 is a diagrammatic view showing the stemming and pitting apparatus of my invention.

In detail, an upper pulley 1 and a lower pulley 2 (Fig. 1) are arranged one above the other, and are supported for rotation about horizontal axes. Said pulleys are end pulleys for an upper endless belt 3 and for a lower endless belt 4. The lower run 5 of belt 3 and the upper run 6 of lower belt 4 extend convergently from pulleys 1, 2 to meeting relation at axially spaced disk-like rollers 7 over which they form the idler rollers 7, the upper and lower runs of belts 4, 3, respectively, extend slantingly downwardly (but generally horizontally) in engagement with each other, and a hopper 8 over said engaging runs is adapted to feed cherries onto said runs.

The belt 4 extends around a pulley 10 at the lower ends of the inclined adjoining runs of belts 3, 4, and the lower run 5 of belt 3 also extends partially around pulley 10 and in engagement with belt 4 to a drive pulley 11 below pulley 10. This partial encirclement of pulley 10 by the lower run of belt 3 provides for driving both belts 3, 4 when pulley 10 is driven, said latter pulley being driven by a sprocket chain or belt 12 that connects the shaft of pulley 10 with the driven sprocket 13 of any suitable gear box 14. A motor 15 is connected by a pulley or chain with the drive shaft of the gear box for driving sprocket 13.

Belt 3 extends vertically from pulley 11 over an idler pulley 17 and then horizontally back to pulley 1.

The belts 3, 4 are respectively formed with spaced circular openings 20, 21 that are of the same size, and which size is such as adapts the openings to receive a single cherry only in each, or a single fruit unit of whatever fruit is being handled.

The openings 20, 21 are preferably arranged in rows extending longitudinally and transversely of the belts and they are in registration with each other along their engaging runs 5, 6 of said belts so that a cherry dropping into any one of the openings 20 will also fall into openings 21 in registration therewith.

The lower belt 4 is provided on its inner, pulley engaging side with elongated members 25, such as cords, etc. that extend centrally across the openings 21 longitudinally of belt 4. These members may be securely attached to belt 4 by any suitable means, so that they will move with the belt and around the several pulleys 2, 10. They merely function to prevent a cherry in each opening 21 from falling through while permitting the stem of such cherry to project downwardly from the run 6 of the belt. Also they function to carry each cherry alone with the belt so that the cherries will not slide on a supporting surface, as they would tend to do were the belt slidably supported on slanting rods.

The cherries that drop into registering openings 20, 21 with their stems projecting upwardly from the run 5 of belt 3 will remain with their stems so projecting.

Pulleys 1, 2 are preferably hollow, and are respectively provided with outwardly projecting circular projections 27, 28 that are adapted to enter the openings 20, 21 as the belts move around said pulleys, the thickness of each projection being substantially equal to that of belts 3, 4, and the said belts are of the same thickness, which is substantially less than the length of an ordinary cherry stem.

Projections 28 on the lower pulley are each formed with a central outwardly opening V groove extending longitudinally of belt 4 for securing the elongated sections of elements 25 that extend across the respective openings 21. Thus the said projections 28 will not interfere with the said elements.

The total thickness of the adjoining runs 5, 6 of belts 3, 4 is preferably less than the diameter of each cherry, or fruit that is being handled. However, the combined thickness of the two runs may be about equal to the diameter of each cherry. In this connection, it should be noted that the thickness of said runs should be such that a cherry will tend to be maintained within openings 20, 21 and so that another cherry lodging on top of the one in any of the registering openings will readily be rolled off by a rotary brush 30 so that only one cherry 31 is carried in each pair of registering openings.

After the belts pass idler disks 7 on their way to pulleys 1, 2, the runs 5, 6 commence to move apart so that the space between rollers 1, 2 and belts 5, 6 at the adjacent sides of said pulleys is about equal to the diameter of the maximum cherry to be pitted. Thus none of the cherries will be mutilated in said space.

Figure 8:
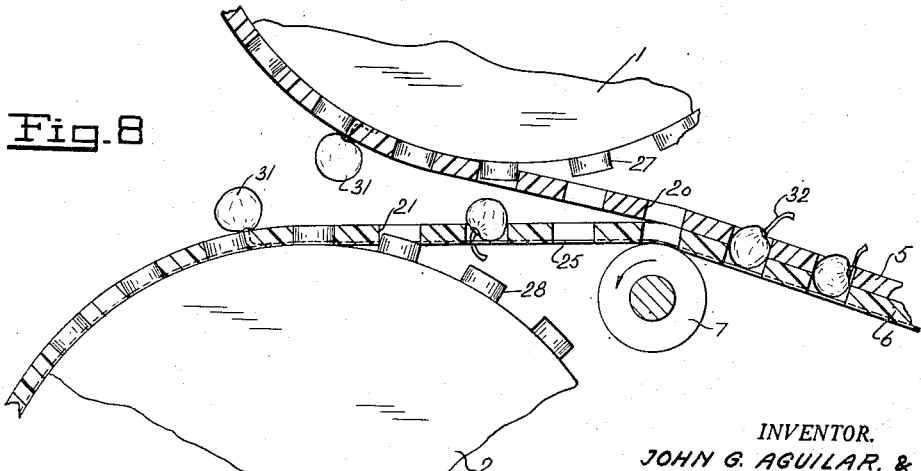
Fig. 8 is a fragmentary part sectional and part elevational view showing how the cherries are caught between the belts and pulleys.

As best seen in Fig. 8, the projecting, upwardly directed stems 32 are gripped between the pulley 1 and belt 3 and the cherries are suspended by their stems outwardly of the outer peripheral surface of belt 3 where the latter passes around the pulley 1. The downwardly directed stems are gripped between pulley 2 and belt 4 and the cherries are similarly suspended.

In the present instance, a special device is combined with the structure above described. This structure is dependent upon the cherries being held by their stems in such a manner that the stem ends of the cherries may be engaged and supported while the stems are held.

Only the unit adjacent the pulley 1 will be described in detail, inasmuch as the same unit is used adjacent pulley 2, and Fig. 2 clearly shows the unit that is adjacent the upper pulley.

The above unit comprises a fixed central shaft 35 supported at its ends by brackets 36 that are in turn secured to frame members 37 of the machine. This shaft is disposed outwardly of the lateral side of pulley 1 where belt 3 extends around the latter.

Secured on the shaft 35 are a plurality of cams 38, there being one for each of the longitudinally extending rows of openings 20 in belt 3, although a continuous cam may be used having the same cross sectional contour shown in Fig. 2, may be used if desired, when the openings 20 of the rows extending transversely of the belt are in rows that extend perpendicularly of the length of said belt and perpendicularly to the longitudinally extending rows.

Rotatably supported on shaft 35 is a drum 39, which drum has heads 105 at opposite ends that may be bolted to the drum, or held on said drum by machine screws 40 threaded into radially inwardly extending ears 41 on said drum.

Secured to one of the heads 105 is a sprocket wheel 42 over which a sprocket chain 43 passes. This sprocket chain extends over another sprocket wheel 44 that is secured on a shaft 45 that in turn is journalled on a bearing secured to frame 37, and a gear 46 also secured on shaft 45 has its teeth in mesh with a gear 47 that is secured on the shaft 48 that carries pulley 1.

By the above structure it will be seen that the drum 39 will be rotated in a direction opposite to that of pulley 1. The adjacent sides of drum 39 and pulley 1 will move in the same direction, but their directions of rotation are opposite.

Figure 5:
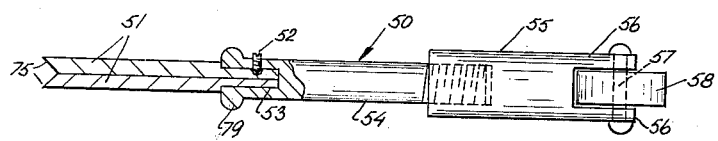
Fig. 5 is an enlarged part sectional, part elevational view of one of the pitting assemblies of Fig. 3, separate from the rest of the machine.
Figure 7:
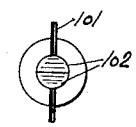
Fig. 7 is an end view of the device of Fig. 6.
Figure 3:
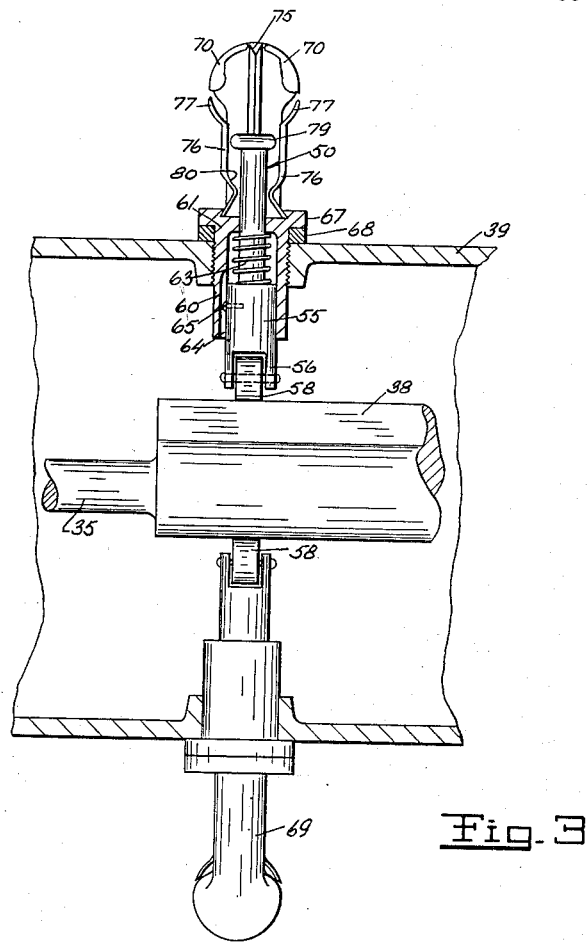
Fig. 3 is an enlarged fragmentary part sectional and part elevational view of the cherry holders and pitters taken along line 3—3 of Fig. 2.

The drum 39 carries a plurality of equally spaced elongated, radially extending pitter members or elements 50 (Figs. 3, 5) that extend through said drum and that are reciprocable.

Each of said pitters comprises a pair of similar semi-round elongated pieces 51 that are arranged parallel with their flat sides together. These pieces together may be called a pitting rod. The opposite outer sides of these pieces at one of their ends are flattened and said flattened ends are releasably held by a screw 52 in the axially outwardly opening socket 53 formed in one end of a rod 54. The opposite end of rod 54 is threadedly secured in one end of a cylindrical, elongated block 55. The other end of block 55 is formed to provide a pair of opposed ears 56 in which the ends of a shaft 57 are secured, and a roller 58 is rotatable on said shaft between said ears. This roller is adapted to engage the outer peripheral surface of cam 38.

The drum 39 is formed with openings in each of which a sleeve 60 is threaded, each sleeve is formed with a head 61 at one end that is centrally apertured for slidably passing the rod 54. The outer end of the sleeve is open and the block 55 is reciprocable within said sleeve with the end that carries the roller projecting therefrom. Thus the sleeve provides a rugged bearing for the pitter assembly.

Between the head 61 and the axially facing end of block 55 that faces said shoulder, is a coil spring 63 that yieldably holds the roller 58 against cam 38 at all times. A side of sleeve 60 is formed with a longitudinally extending slot 64 (Fig. 3) into which projects the head of a pin 65 that is secured to the block 55. This pin-slot arrangement virtually forms a splined joint between the sleeve and the pitter assembly so that the latter will not rotate about its longitudinal axis.

Each annular row of pitting elements is coplanar with each of the longitudinally extending rows of openings in belt 3.

Figure 4:
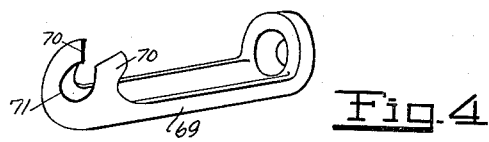
Fig. 4 is an enlarged perspective view of one of the elements for supporting the stem side of a cherry during pitting, the slot for the stem and for passing the pit being clearly shown.

Secured between a radially outwardly extending flange 67 on the sleeve 60 outwardly of drum 39 and the drum is a collar 68 that carries an arm 69 extending parallel with the pitting rod (pieces 51) and spaced therefrom (Fig. 2). Each of these arms 69 is formed at its outer end with a pair of spaced fingers 70 (Fig. 4) that are directed circumferentially of the direction of rotation of arms 69 when the drum 39 is rotated, with the outer ends of said fingers in leading position. The space between said fingers defines a slot 71 that may be enlarged to provide for passage of the cherry pits therethrough as will be explained later on.

The fingers are of relatively thin material and are shaped to somewhat resemble a scoop or spoon (except for the slot 71) with a concave surface at the juncture between the arm 69 and fingers 70, and the inner sides of the arms are concavely curved. This concave curvature generally corresponds with the convex curvature of the outer sides of the maximum sized cherry that may be handled.

The drive of the drum 39 is such that the fingers 70 will slip to a straddling relation to stem 32 of each cherry 31 that is suspended from the pulley 1 at the point where the cherry is nearest to drum 39. As already noted, the fingers 70 and the cherries will be moving in the same direction at said point, and as soon as it is passed, the fingers will progressively move away from the belt 3.

When the fingers 70 move to straddling position relative to the stem 32 of each cherry, the inner end of the pitter assembly (roller 58) is on the low side of cam 38, and the space between the outer end of the pitter rod (pieces 51) and the slot 71 between fingers 70 is greater than the diameter of the maximum sized cherry that is to be pitted. Hence the cherry 31 will readily slip to a position between the fingers and the pitter at the point where the fingers move to straddle the cherry stem.

As the drum 39 and pulley 1 (including belt 3) continue to rotate, the portion of the stem 32 between the belt and the fingers 70 will be drawn taut and the stem end of the cherry will be drawn against the fingers so that the stem-blossom axis of the cherry is coaxial with the central axis of the pitter. The pitter at this point will be moving into engagement with the blossom end of the cherry due to the gradual rise of the cam surface of cam 38, and the stem will be gradually pulled from the cherry at the same time. As the drum 39 continues to revolve the pitter rod will engage this pit of the cherry and will push it out of the stem end of the latter and through the enlargement in slot 71.

The outer ends of the pieces 51 of the pitter rod are bevelled at their adjacent sides as at 75 to form a V-shaped recess in the outer end of the pitter in which the pit of the cherry is seated as it is pushed out of the cherry.

Secured at one of their ends in the end of sleeve 60 adjacent flange 67 are a pair of spring clamping arms 76 extending alongside the opposite sides of the pitter 50. The outer ends 77 of these arms extend divergently and are curved to partially extend around the blossom end of a cherry when said outer ends are moved toward each other. When the pitter rod (pieces 51) is retracted preparatory to a cherry being positioned between fingers 70 and said rod, the arms 76 extend divergently outwardly from their ends that are secured to sleeve 60. This space between the ends 77 is ample to permit the largest cherry to freely move to a position between said ends without interference. The spreading of arms 76 to this position is accomplished by a radially outwardly extending enlargement 79 on the outer end of the rod 54 in which the pieces 51 are secured. This enlargement engages inwardly extending surfaces 80 (Fig. 3) on the inner ends of arms 76 forcing them apart under the cam action resulting from the engagement between said surfaces and said enlargement. However, just as soon as the pitter commences to move toward the cherry, the enlargement 79 leaves the surfaces 80 and the outer ends 77 move toward each other and into engagement with the blossom end of the cherry for firmly holding the cherry in its oriented position during the entire pitting operation. By the above structure, should the cherry stem be pulled from the cherry before the pitter engages the latter, the cherry will not be moved out of its oriented position in which its stem blossom axis is coaxial with the axis of the pitter. As soon as the pitter is withdrawn the enlargement 79 will engage surfaces 80 to again spread the arms 76 and to release the cherry that has been pitted.

In order to prevent mutilation of the cherry as the pit is ejected therefrom, and to provide a backing for the cherry at the slot, as well as to insure ejection of the pit, a rotor generally designated 90 (Fig. 2) is provided adjacent the point where the pit emerges from the cherry under the influence of the pitter.

This rotor 90 comprises a shaft 91 that is journalled at its ends for rotation in bearings carried by frame members 92 that are rigid with the main frame. A sprocket wheel 93 is secured to one end of shaft 91 and a chain 94 extends around said sprocket wheel 93 connecting the latter with a sprocket wheel 95 that is secured to sprocket wheel 42 for rotation with the latter and with drum 39.

Secured to shaft 91 are radially extending pairs of arms 96. The outer ends of each pair of arms carries a centrally apertured rubber or rubber-like pad 97 that is relatively thin around the aperture, but progressively thicker toward its edges. The central aperture in the pad is substantially the diameter of the average cherry pit and may be slightly smaller, and the drive between the rotor 90 and the pitter assembly is such that a pad 97 will be rotated into position snugly against the radially outwardly facing sides of fingers 70 at the point where the pit of each cherry is ejected from the cherry. The pit will pass through the central opening in pad 97 and will be discharged as the rotor and pitting assembly continue their rotation.

When the aperture in the rubber pad is slightly smaller than the pit, there is a tendency for the pad to facilitate ejection of the pit as maximum diameter of the pit passes through the aperture.

While not absolutely necessary in every case, it is many times desirable to provide an air jet 100 adjacent the point where the fingers 70 slide between the cherry and the belt 3. This jet is so directed that the air therefrom will force the cherry into sealing relation against fingers 70 adjacent their rear ends even before the cherries are held by any other means. This is particularly desirable in connection with the pitting device adjacent the pulley 2, inasmuch as the cherries carried around pulley 2 move downwardly as do the fingers 70, while the cherries and fingers 70 move upwardly adjacent the pulley 1.

Figure 6:
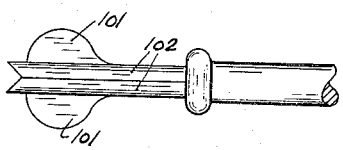
Fig. 6 is a modified pitting element adapted to be substituted for the pitting element of Figs. 1, 2, 5, but including a cutter for bisecting the cherries at the same time they are pitted.

The present device is also suitable for bisecting cherries, and this is done by providing each of the pieces 51 with a blade 101 (Fig. 6), the outer curved edges of which adjoin the outer ends of the pieces 51. In Fig. 6 the pieces that carry the blades are designated 102, but they are the same as pieces 51 except for the blades. Also, it is to be noted that the cutting edges of said blades are linearly curved to follow the contour of the inner concave sides of the fingers 70, which in turn conform to the convex sides of the cherries, thereby insuring a complete severance of the cherry into two pieces.

The advantage of these blades is appreciable, since the price of cherry halves depends greatly upon whether or not the cherries have been bisected in a plane in which the stem-blossom ends of the cherries are positioned. If the cherries have been bisected transversely of this plane, then their price is less.

It is to be noted that as many pitters may be arranged on the drum 39 as may be desired, and the diameter of the drum may be increased to provide for a greater number of pitters than is shown, although even with the diameter indicated, double the number could be provided.

The operation of the invention is believed to be clear from the description, and it is to be understood that there may be modifications in the structure that do not affect the invention.

We claim:

1. The method of pitting and stemming cherries that comprises the steps of moving said cherry in one direction along a predetermined path of travel, gripping the stem of said cherry at a point in said path and suspending said cherry from said stem during said movement and continuing said movement of the said cherry along said path suspended from said stem, then aligning the portion of said stem adjacent said cherry with the stem-blossom axis by pulling said cherry and said stem oppositely relatively, pushing on the blossom end of said cherry at a point on the stem-blossom axis while said stem is so aligned and continuing said pulling until said stem is removed, and thereafter pushing the pit of said cherry out of the stem end of said cherry along a line coaxial with the stem-blossom end of said cherry.

2. In a cherry stemmer having a stem gripping conveyor adapted to support cherries from their stems for movement of the cherries along a path of travel parallel with and alongside the path of movement of said conveyor; a stem straddling element alongside said conveyor having a pair of fingers adapted to straddle the stem of each cherry so moved along said path of travel and to engage each such cherry at opposite sides of its stem, means supporting said element for movement to a position so straddling the stem of each cherry at a point along the said path of travel of the latter and for movement away from said path and said conveyor with said fingers in said engagement with each cherry whereby each cherry so engaged will be pulled from its stem and will be carried away by said fingers, means for so moving said element, cherry gripping devices supported adjacent said fingers for movement therewith and into engagement with the sides of each cherry adjacent its blossom end when each cherry is supported in engagement with said fingers for holding each cherry against said fingers, means for so moving said devices into their said engagement with each cherry.

3. In a cherry stemmer having a stem gripping conveyor adapted to support cherries from their stems for movement of the cherries along a path of travel parallel with and alongside the path of movement of said conveyor; a stem straddling element alongside said conveyor having a pair of fingers adapted to straddle the stem of each cherry so moved along said path of travel and to engage each such cherry at opposite sides of its stem, means supporting said element for movement to a position so straddling the stem of each cherry at a point along the said path of travel of the latter and for movement away from said path and said conveyor with said fingers in said engagement with each cherry whereby each cherry so engaged will be pulled from its stem and will be carried away by said fingers, means for so moving said element, cherry gripping devices supported adjacent said fingers for movement therewith and into engagement with the sides of each cherry adjacent its blossom end when each cherry is supported in engagement with said fingers for holding each cherry against said fingers, means for so moving said devices into their said engagement with each cherry, and means between said devices automatically movable into engagement with the latter at a predetermined point in the movement of said element away from said conveyor for moving said devices apart and thereby releasing each cherry.

4. In a cherry stemmer having a stem gripping conveyor adapted to support cherries from their stems for movement of the cherries along a path of travel parallel with and alongside the path of movement of said conveyor; a stem straddling element alongside said conveyor having a pair of fingers having cherry engaging surfaces generally conforming to the shape of the stem end of a cherry adapted to straddle the stem of each cherry so moved along said path of travel and to engage each such cherry at opposite sides of its stem, means supporting said element for movement to a position so straddling the stem of each cherry at a point along the said path of travel of the latter and for movement away from said path and said conveyor with said fingers in said engagement with each cherry whereby each cherry so engaged will be pulled from its stem and will be carried away by said fingers, means for so moving said element, a pitting member supported at the sides of said fingers that are adapted to engage each cherry for reciprocation through each such cherry that is so engaged by said fingers and along a line extending between said fingers for forcing the pit of such cherry between said fingers, and means for so reciprocating said member.

5. In a cherry stemmer having a stem gripping conveyor adapted to support cherries from their stems for movement of the cherries along a path of travel parallel with and alongside the path of movement of said conveyor; a stem straddling element alongside said conveyor having a pair of fingers having cherry engaging surfaces generally conforming to the shape of the stem end of a cherry adapted to straddle the stem of each cherry so moved along said path of travel and to engage each such cherry at opposite sides of its stem, means supporting said element for movement to a position so straddling the stem of each cherry at a point along the said path of travel of the latter and for movement away from said path and said conveyor with said fingers in said engagement with each cherry whereby each cherry so engaged will be pulled from its stem and will be carried away by said fingers, means for so moving said element, a pitting member supported at the sides of said fingers that are adapted to engage each cherry for reciprocation through each such cherry that is so engaged by said fingers and along a line extending between said fingers for forcing the pit of such cherry between said fingers, and means for so reciprocating said member, a yieldable backing member positioned at a point along the path of movement of said fingers and cherry when the latter is carried away from its stem and from said conveyor, said backing member including an aperture positioned in alignment with the said line of movement of said pitting member when the latter is moved to said latter point for passage of the pit therethrough when it is pushed from said cherry, said backing member being substantially in engagement with said fingers when the latter are moved to said support.

JOHN G. AGUILAR.
WILLIAM A. COX.

References Cited in the file of this patent

UNITED STATES PATENTS

| Number | Name | Date |
|---|---|---|
| 1,409,803 | Urschel | Mar. 14, 1922 |
| 2,133,588 | Steinwand | Oct. 18, 1938 |
| 2,243,530 | Kok | May 27, 1941 |
| 2,361,834 | Frova | Oct. 31, 1944 |
| 2,375,350 | Coons | May 8, 1945 |
| 2,415,418 | Coons | Feb. 11, 1947 |
| 2,462,682 | Schubert | Feb. 22, 1949 |

FOREIGN PATENTS

| Number | Country | Date |
|---|---|---|
| 625,009 | France | Apr. 16, 1927 |
| 484,201 | Germany | Oct. 12, 1929 |
| 486,035 | Germany | Nov. 9, 1929 |